(12) United States Patent
Maida et al.

(10) Patent No.: US 9,148,798 B2
(45) Date of Patent: Sep. 29, 2015

(54) SCRAMBLING CODE SELECTION

(71) Applicant: Ubiquisys Limited, Swindon, Wiltshire (GB)

(72) Inventors: Aminu Wada Maida, Swindon (GB); Alan James Auchmuty Carter, Swindon (GB); Simon Pearcey, Bath (GB); Andrea Giustina, Milan (IT)

(73) Assignee: Ubiquisys Limited, Swindon (GB)

( * ) Notice: Subject to any disclaimer, the term of this patent is extended or adjusted under 35 U.S.C. 154(b) by 196 days.

(21) Appl. No.: 13/715,783

(22) Filed: Dec. 14, 2012

(65) Prior Publication Data

US 2014/0004860 A1    Jan. 2, 2014

Related U.S. Application Data

(63) Continuation of application No. 12/821,042, filed on Jun. 22, 2010, now abandoned.

(30) Foreign Application Priority Data

Aug. 11, 2009 (GB) .................................. 0914020.3

(51) Int. Cl.
*H04B 7/216* (2006.01)
*H04W 24/02* (2009.01)
(Continued)

(52) U.S. Cl.
CPC ............. *H04W 24/02* (2013.01); *H04B 1/7083* (2013.01); *H04J 11/0056* (2013.01); *H04W 8/26* (2013.01); *H04B 2201/70702* (2013.01); *H04W 84/045* (2013.01)

(58) Field of Classification Search
CPC ...................................................... H04W 24/02
USPC ........................................................ 370/342
See application file for complete search history.

(56) References Cited

U.S. PATENT DOCUMENTS

2002/0168985 A1* 11/2002 Zhao et al. ..................... 455/456
2007/0097939 A1   5/2007 Nylander et al.
(Continued)

FOREIGN PATENT DOCUMENTS

CN    101278580 A    10/2008
EP    2048901        4/2009
(Continued)

OTHER PUBLICATIONS

Uk Intellectual Property Office Search Report dated Nov. 5, 2009 issued in GB0914020.3.
(Continued)

*Primary Examiner* — Christopher R Crompton
(74) *Attorney, Agent, or Firm* — Weaver Austin Villeneuve & Sampson LLP

(57) ABSTRACT

A basestation forms part of a group of basestations within a cellular communications network, and selects an identifying code for use in identifying transmissions from the basestation. The basestation receives from a management node a first list of identifying codes and a second list of identifying codes, wherein the identifying codes of the first list can appear in neighbor cell lists of basestations outside said group, and wherein the identifying codes of the second list can not appear in neighbor cell lists of basestations outside said group. The basestation determines whether there is at least one identifying code either in the first list of identifying codes or the second list of identifying codes that is not used by any other basestation in said group. If there is at least one identifying code in the first list of identifying codes and at least one identifying code in the second list of identifying codes that are not used by any other basestation in said group, an identifying code from the first list of identifying codes is selected in preference to an identifying code from the second list of identifying codes.

18 Claims, 8 Drawing Sheets

(51) Int. Cl.
*H04B 1/7083* (2011.01)
*H04J 11/00* (2006.01)
*H04W 8/26* (2009.01)
*H04W 84/04* (2009.01)

(56) References Cited

U.S. PATENT DOCUMENTS

| | | | |
|---|---|---|---|
| 2008/0039141 A1* | 2/2008 | Claussen et al. | 455/561 |
| 2008/0101301 A1* | 5/2008 | Thomas et al. | 370/335 |
| 2008/0188265 A1* | 8/2008 | Carter et al. | 455/561 |
| 2008/0188266 A1* | 8/2008 | Carter et al. | 455/561 |
| 2008/0268856 A1* | 10/2008 | Francalanci et al. | 455/446 |
| 2009/0129291 A1 | 5/2009 | Gupta et al. | |
| 2010/0178921 A1* | 7/2010 | Aqvist et al. | 455/436 |
| 2010/0317349 A1* | 12/2010 | Serravalle | 455/440 |
| 2011/0039539 A1 | 2/2011 | Maida | |
| 2011/0194534 A1* | 8/2011 | Carmon et al. | 370/331 |
| 2012/0083269 A1 | 4/2012 | Kobayashi et al. | |

FOREIGN PATENT DOCUMENTS

| | | |
|---|---|---|
| EP | 2079263 | 7/2009 |
| EP | 2083595 | 7/2009 |
| GB | 2443236 | 4/2008 |
| GB | 2452688 | 3/2009 |
| JP | 2009-094559 A | 4/2009 |
| JP | 2010-263461 A | 11/2010 |
| WO | WO 2006/058562 | 6/2006 |
| WO | WO 2007/040451 A1 | 4/2007 |
| WO | WO 2008/093100 | 8/2008 |
| WO | WO 2008/147268 A1 | 12/2008 |
| WO | WO 2009/022974 | 2/2009 |
| WO | WO 2009/082307 | 7/2009 |
| WO | WO2010/006298 | 1/2010 |
| WO | WO 2010/146785 | 12/2010 |

OTHER PUBLICATIONS

International Search Report and Written Opinion, dated Mar. 11, 2011, issued in International Application No. PCT/GB2010/050998.

Annex to Form PCT/ISA/206 (Invitation to Pay Additional Fees)—Communication Relating to the Results of the Partial International Search, dated Oct. 28, 2010, issued in PCT/GB2010/050998.

NTT Docomo et al., "Cell ID Assignment for Home Node B," 3GPP Draft; R1 073684 Cell ID Assignment for Home Node B, 3rd Generation Partnership Project, Mobile Competence Centre; Aug. 15, 2007.

"Cell Identification for HNB," 3GPP Draft; R2-083588 Cell Identification for HNB, 3rd Generation Partnership Project, Mobile Competence Centre; Jul. 2, 2008.

Nonfinal Office Action dated Jun. 14, 2012, U.S. Appl. No. 12/821,042.

EP Search Report dated Jul. 18, 2014 for EP Application No. 13189417.2.

JP Office Action dated Mar. 14, 2014 for JP Application No. 2012-524283.

CN Office Action dated Feb. 20, 2014 for CN Application No. 201080035684.9.

RU Office Action dated May 19, 2014 for RU Application No. 2012108042.

CN Office Action dated Aug. 22, 2014 for CN Application No. 201080035684.9.

EP Office Action dated Nov. 3, 2014 for EP Application No. 13189417.2.

* cited by examiner

SCRAMBLING CODE SELECTION

This application is a continuation that claims priority to U.S. patent application Ser. No. 12/821,042, filed on Jun. 22, 2010, and entitled "SCRAMBLING CODE SELECTION", which in turn claims priority to GB 0914020.3, filed Aug. 11, 2009, and entitled "SCRAMBLING CODE SELECTION". Both of these prior applications is hereby incorporated by reference and for all purposes.

This invention relates to a mobile communication network, and in particular to methods and systems whereby a cellular basestation can select its own scrambling code.

It is known to establish femtocell access points in a building, in order to provide improved coverage for users of a cellular communication network, amongst other advantages. When a registered user device is within the coverage area of a femtocell access point, it can establish a connection with that access point, with the connection from the access point into the core network of the cellular network being established over a pre-existing broadband internet connection, for example. When the user leaves the coverage area of the femtocell access point, the connection can be handed over to a macrocell base station of the cellular network.

It is also known to establish a network of such femtocell access points.

One issue that arises with cellular communications networks is that there a limited number of scrambling codes, which must be shared between the basestations of the network. In a conventional network, the allocation of the scrambling codes to the basestations is performed as part of a network planning operation, in order to maximise the distance between basestations that share the same scrambling code. In the case of femtocell access points, there is no such network planning, and each femtocell access point is responsible for selecting its own scrambling code, in a way that similarly attempts to maximise the distance between basestations that share the same scrambling code.

Where there is a network of femtocell access points, for example within a single building or otherwise within a relatively small area, the problem of scrambling code selection becomes more complex.

In accordance with aspects of the invention, this problem is solved by suitable selection of scrambling codes when there are unused scrambling codes, and when there is a clash between two femtocell access points using the same scrambling code.

According to a first aspect of the present invention, there is provided a method, for use in a basestation forming part of a group of basestations within a cellular communications network, for selecting an identifying code for use in identifying transmissions from the basestation, the method comprising:
   receiving from a management node a first list of identifying codes and a second list of identifying codes, wherein the identifying codes of the first list can appear in neighbour cell lists of basestations outside said group, and wherein the identifying codes of the second list can not appear in neighbour cell lists of basestations outside said group;
   determining whether there is at least one identifying code either in the first list of identifying codes or the second list of identifying codes that is not used by any other basestation in said group; and
   if there is at least one identifying code in the first list of identifying codes and at least one identifying code in the second list of identifying codes that are not used by any other basestation in said group, selecting an identifying code from the first list of identifying codes in preference to an identifying code from the second list of identifying codes.

According to a second aspect of the present invention, there is provided a method, for use in a basestation forming part of a group of basestations within a cellular communications network, for selecting an identifying code for use in identifying transmissions from the basestation, the method comprising:
   receiving from a management node a first list of identifying codes and a second list of identifying codes, wherein the identifying codes of the first list can appear in neighbour cell lists of basestations outside said group, and wherein the identifying codes of the second list can not appear in neighbour cell lists of basestations outside said group;
   determining whether it is necessary to be able to perform cell reselection between the basestation and basestations outside said group;
   if it is determined that it is necessary to be able to perform cell reselection between the basestation and basestations outside said group, selecting an identifying code from the first list of identifying codes; and
   if it is determined that it is not necessary to be able to perform cell reselection between the basestation and basestations outside said group, selecting an identifying code from the first list of identifying codes or from the second list of identifying codes.

According to a third aspect of the present invention, there is provided a method, for use in a management node of a cellular communications network, wherein the network includes at least one group of basestations and further includes other basestations not within said group, the method comprising:
   dividing the available identifying codes into a first list of identifying codes and a second list of identifying codes, wherein the identifying codes of the first list can appear in neighbour cell lists of basestations outside said group, and wherein the identifying codes of the second list can not appear in neighbour cell lists of basestations outside said group; and
   notifying the basestations in said group of basestations of the first list of identifying codes and the second list of identifying codes.

According to a fourth aspect of the present invention, there is provided a method of allocating identifying codes to basestations forming part of a group of basestations within a cellular communications network, the method comprising, in each basestation within the group:
   selecting an identifying code in a manner that attempts where possible to avoid selecting the same identifying code as a neighbour,
   and the method further comprising, in at least one basestation within the group:
   determining that a clash has occurred if any neighbour basestation has selected the same identifying code as said at least one basestation, and
   if a clash has occurred, determining whether the clash can be resolved by said basestation or by another basestation in said group.

According to other aspects of the invention, there are provided basestations and management nodes operating in accordance with these methods.

Thus, in an embodiment of the invention, at power up each access point within the group will automatically select a primary scrambling code/MIB Value Tag (PSC/MVT) combination based on one or more lists of allowed PSCs. Based on the list of scrambling codes provided by the ZMS, the PSCs already selected and communicated via the MRT and the results of its own monitoring of the radio environment, the femtocell access point would attempt to select a unique PSC/MVT combination. If it is not possible to select a unique PSC/MVT combination then one of the PSC/MVT combinations already in use by another access point can be reused. When an access point reuses a PSC it should try to minimise the possibility that its coverage area will overlap with the coverage area of another access point using the same PSC/MVT combination. When making the selection, the femtocell access point should preferably take into account all PSCs that are being used within the group, and in other groups located nearby (multiple groups may be designated in the same space), and by other femtocell access points even if they are not part of any group.

For a better understanding of the present invention, and to show how it may be put into effect, reference will now be made, by way of example, to the accompanying drawings, in which:—

Figure 1:
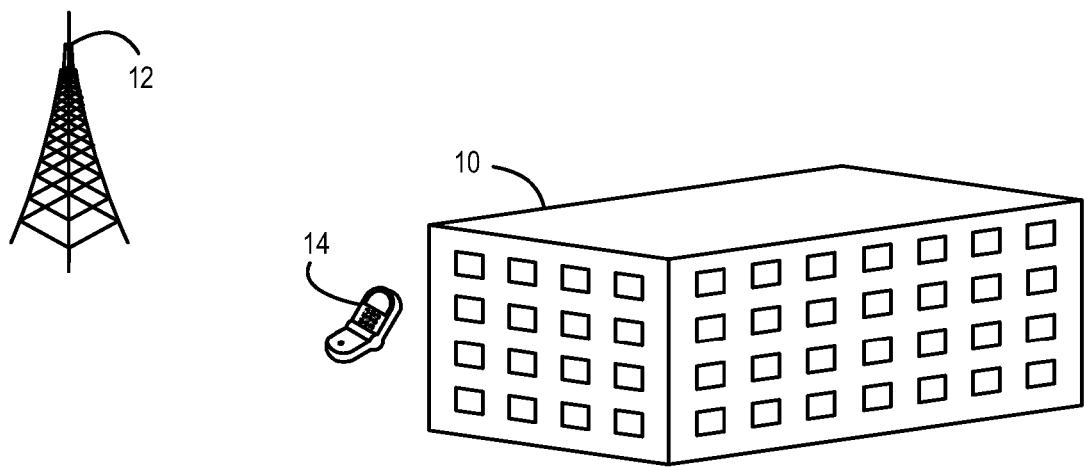
FIG. 1 shows a building in a coverage area of a cellular communications network.

FIG. 1 shows a building 10, which is located within the coverage area of a macrocell base station 12 of a cellular communications network. Thus, user devices, such as mobile phones 14, laptop computers and the like, that are in the vicinity of the building 10 can obtain a cellular service by establishing a connection into the cellular network through the macrocell base station 12.

However, it is known that cellular coverage within buildings can be poor, leading to unavailability of service, or forcing user devices to transmit signals at high transmit powers, leading to shorter battery life.

Femtocell access points are therefore deployed within the building 10, with the intention that user devices located within the building at least should be able to obtain a cellular service by establishing a connection into the cellular network through one of the femtocell access points.

Although the invention is described herein with reference to the deployment of femtocell access points within a building, within which users are expected to circulate, such as an office building, an educational establishment, or a shopping mall, it will be apparent that the invention is applicable to other situations. For example, the invention is equally applicable to outdoor deployment of femtocell access points, especially but not exclusively in locations where there is common ownership and/or management of an area in which users are expected to circulate.

Figure 2:
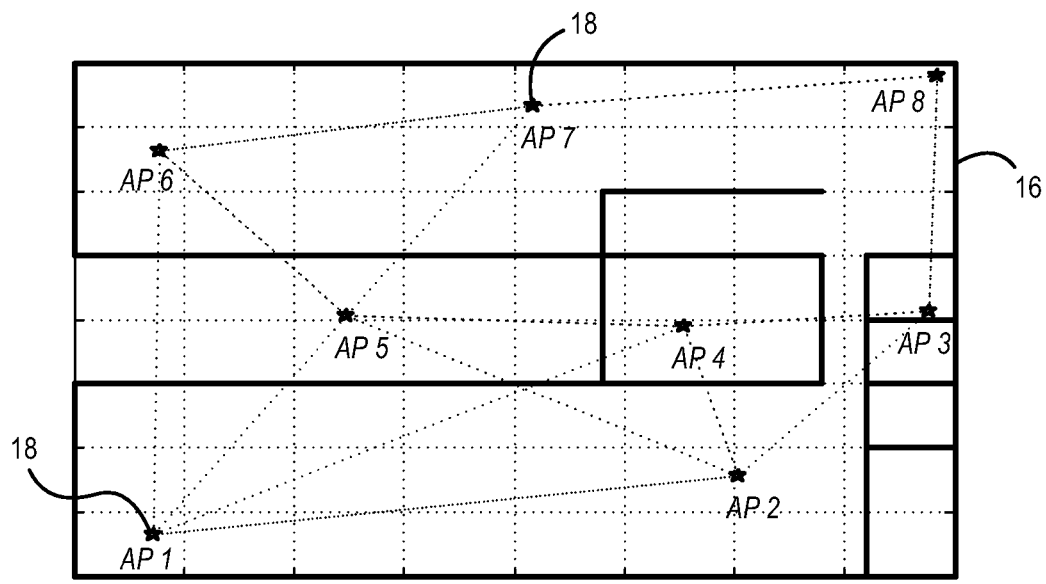
FIG. 2 shows the deployment of multiple femtocell access points in the building.

FIG. 2 is a schematic representation of one level 16 within the interior of the building 10. In this example, the building 10 is an office building, and the whole of the level 16 is occupied by a single corporate entity. Based on the number of expected users within the level 16 at any one time, a suitable number of femtocell access points 18 are deployed. The eight femtocell access points shown in FIG. 2 are indicated as AP1 -AP8.

The femtocell access points 18 are located in suitable positions. For example, it may be appropriate to provide a femtocell access point close to the or each entrance/exit point, so that users entering or leaving the building can spend as long as possible connected to one of the femtocell access points. One or more of the femtocell access points in the entrance/exit points of the building, such as the access point AP5, can be designated as a 'gateway' cell, in that it provide the gateway to the femtocell network from the surrounding macro layer. In addition, the femtocell access points should be distributed throughout the space, so that any user within the space will be able to establish a connection with one of the femtocell access points.

Figure 3:
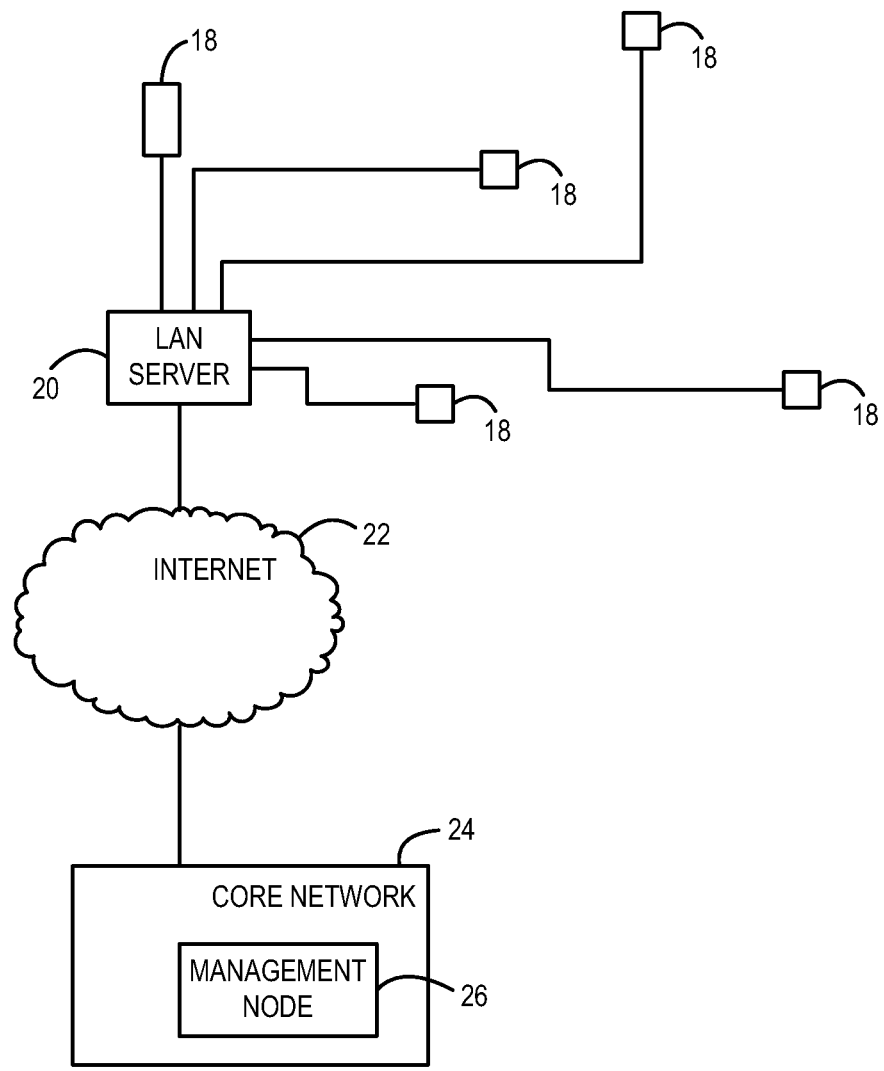
FIG. 3 is a schematic illustration showing the presence of femtocell access points in a wider communications network.

FIG. 3 is a schematic diagram, illustrating network connections of the femtocell access points. Specifically, the femtocell access points 18 in a group are all connected to a local area network (LAN) having a LAN server 20, which also has a connection to a wide area network 22, in particular a public wide area network such as the internet. The femtocell access points 18 are able to connect over the wide area network 22 to a core network 24 of the cellular communications network. The core network 24 includes a management node 26, which monitors and controls where necessary the operation of the femtocell access points 18.

In one embodiment of the invention, the management node 26 distributes to all femtocell access points 18 in the group the relevant information about the group, including: the IDs of all femtocell access points in the group; and their main RF parameters, such as the UTRA Absolute RF Channel Number (UARFCN) and scrambling code (SC), the Location Area Code (LAC) and Cell-ID, and the initial power levels.

The femtocell access point can enter the downlink monitor mode, in which it can detect signals transmitted by other femtocell access points, to capture the identities of the neighbouring femtocell access points. Thus, by matching the detected UARFCN/SC and LAC/Cell-ID transmitted by each femtocell access point with the information received from the management node 26, the femtocell access point 18 is able to populate automatically the neighbour table. This can then be used in the case of handovers for local mobility. Thus, mobility within the group is fully supported. Cell-reselection with other femtocell access points is achieved by each broadcasting the relevant carrier and scrambling code information. Handover from one femtocell access point to another can be achieved because each femtocell access point has a full map of its neighbour femtocell access points, including their IDs, and so it can send a handover command that is unequivocally pointing to a specific femtocell access point. Full support is provided for circuit-switched (CS), packet-switched (PS) and multiple Radio Access Bearer (Multi-RAB) call mobility, and for intra-frequency and inter-frequency handovers between femtocell access points.

In addition, each femtocell access point receives periodic measurement reports from its connected user equipments, with these reports indicating the signal strengths of intra-frequency neighbouring femtocell access points. Further, each femtocell access point sends measurement control messages to its connected user equipments that are operating in compressed mode, requiring them to provide periodic measurements of their inter-frequency neighbouring femtocell access points.

Further, each femtocell access point is able to communicate with the other femtocell access points by means of the local area network to which they are connected.

Figure 4:
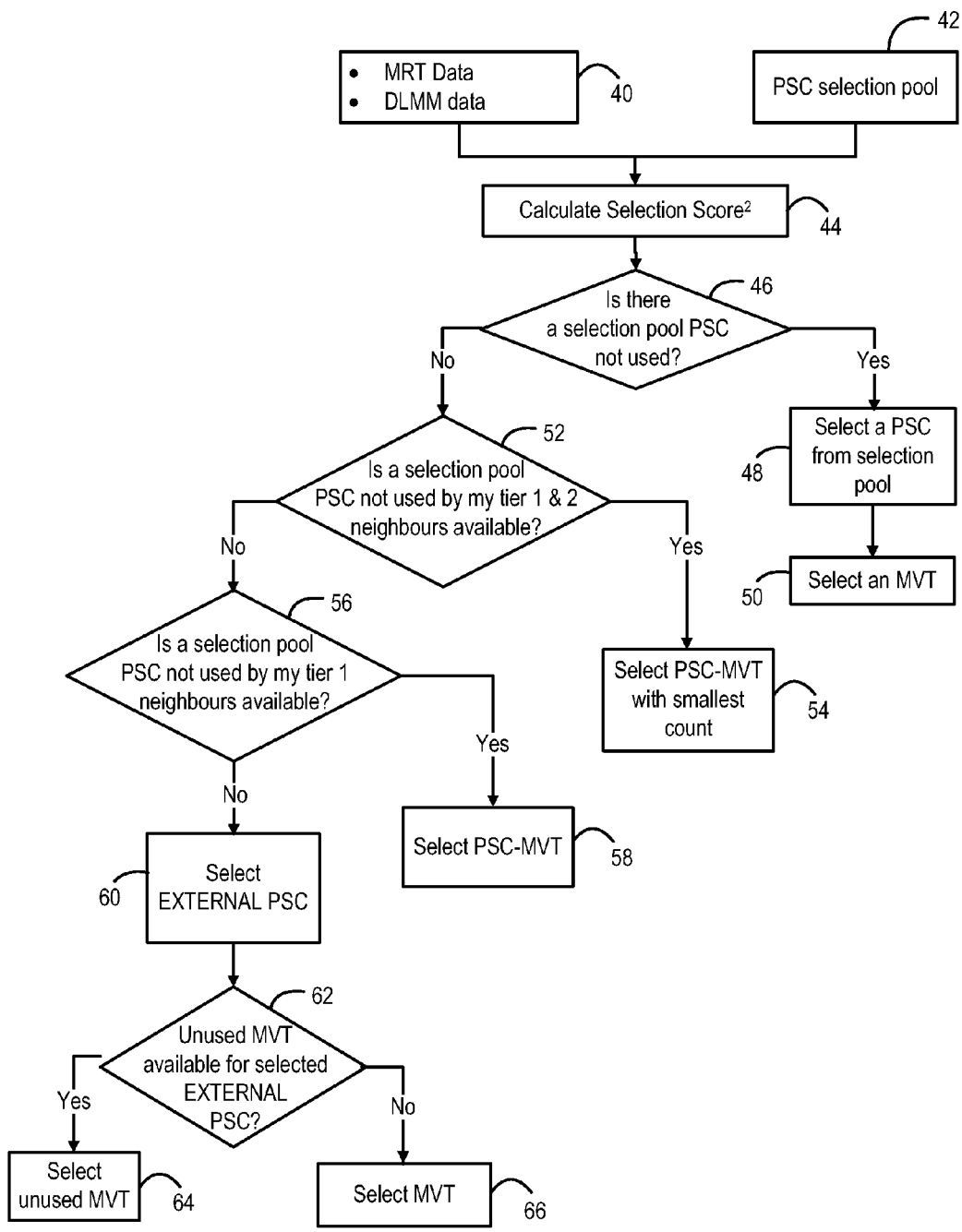
FIG. 4 is a flow chart illustrating a first process in accordance with the present invention.

FIG. 4 is a flow chart illustrating in general terms the procedure that is followed in a femtocell access point when selecting a primary scrambling code. This procedure is preferably performed whenever the femtocell access point is powered up. The procedure can then be performed again whenever it appears that it would produce different results. For example, when the femtocell access point detects signals from a new nearby femtocell access point, the procedure can be performed again in order to check that the selected scrambling code remains optimal.

In step 40, the femtocell access point notes the data that it has received in its downlink monitor mode (DLMM). As mentioned above, this includes the identity of each cell from which it is able to detect signals, and also includes the scrambling codes used by such cells.

In addition, the femtocell access point notes the data contained in the current Master Relationship Table (MRT).

The Master Relationship Table includes the following information about each femtocell access point in the group, namely: the unique Cell ID of the femtocell access point; the Group ID of the femtocell access point; the frequency and Primary Scrambling Code selected by the femtocell access point; the Cell ID, Primary Scrambling Code, UARFCN, CPICH Tx power adjustment and CPICH Tx power of other femtocell access points and Macro Layer nodeBs detected by that femtocell access point; and strongest detected cell information.

Whenever a femtocell access point powers up for the first time it broadcasts a message to indicate that it now part of the network. A random femtocell access point then sends it a copy of the MRT so that it can start its automatic configuration.

New femtocell access points are always added into the MRT with a particular time stamp (known as the creation time stamp). The priority of the femtocell access point is sometimes determined by the value of the time stamp, as described below.

Whenever a femtocell access point changes its configuration (either chooses a new frequency and/or scrambling code, or updates the Mobility Table) it will rebroadcast the MRT over the local area network with these changes. In addition, the management system may remove femtocell access points from the MRT if they appear to be inactive.

Whenever a femtocell access point receives an updated master relationship table, it will check if it has been added as a neighbour to any other femtocell access point, and is so will reciprocate the listing.

In addition, the femtocell access point will check for and resolve any primary scrambling code (PSC) conflicts, by following the procedure for setting the scrambling code, as described below.

Based on the information received in step 40, the femtocell access point is able to divide the other femtocell access points in the group into tiers. The tier of a neighbour femtocell access point (or Macro Layer Neighbour) indicates the number of steps through which the femtocell access point has become aware of the neighbour. Thus, a Tier 1 neighbour may be one which the femtocell access point has itself detected in its Downlink Monitor Mode. Alternatively, the neighbour may have detected the femtocell access point in its own Downlink Monitor Mode, and the femtocell access point may have become aware of this through the Master Relationship Table and reciprocated the relationship. A Tier 2 neighbour is one which the femtocell access point has become aware of through a Tier 1 neighbour. Knowledge of the Tier 2 neighbour may be obtained from SIB (System Information Block) 11 of a Tier 1 femtocell access point or Macro Layer Neighbour. Alternatively, knowledge of the Tier 2 neighbour may be obtained by looking up the Master Relationship Table entry of a Tier 1 neighbour. A Tier 3 neighbour is one which the femtocell access point has become aware of by looking up the Master Relationship Table entry of a Tier 2 neighbour. Depending on the size of the network, lower Tier neighbours might also exist, with the femtocell access point becoming aware of them through looking up the Master Relationship Table entry of a neighbour in the previous tier.

In step 42 of the procedure shown in FIG. 4, the femtocell access point receives information about the primary scrambling code (PSC) selection pool, i.e. the list of PSCs from which it can select its own PSC.

In one embodiment of the invention, the primary scrambling codes that are available in the cellular network are divided into an External Scrambling Code List and an Internal Scrambling Code List. The primary scrambling codes in the External Scrambling Code List are the preferred scrambling codes. These scrambling codes would appear in the neighbour cell lists of the Macro Layer and would typically be used by those femtocell access points that can see the Macro Layer. The primary scrambling codes in the Internal Scrambling Code List are the non-preferred scrambling codes. These scrambling codes would not appear in the neighbour cell lists of the Macro Layer and would therefore typically be used, if at all, by those femtocell access points that can not see the Macro Layer.

Thus, in step 42, the femtocell access point receives, for example from the management node 26, information as to whether its selection pool contains only the primary scrambling codes in the External Scrambling Code List, or whether it also contains the scrambling codes in the Internal Scrambling Code List. This mechanism is used to explicitly provision a femtocell as a 'gateway' cell, i.e. one in the entrance/ exit point of the femtocell coverage.

In addition the femtocell can also receive information from the management node 26 that causes it to determine automatically whether it should configure itself with this 'gateway' status. For example, the femtocell access point can be configured such that it gathers statistics based on the history of user equipments reselecting from the femtocell access point to the macro network, or to the femtocell access point from the macro network. Based on the recent history, the femtocell access point can determine whether it should act as a 'gateway' cell. This status can change. For example, a femtocell access point might configure itself as a 'gateway' cell, restricting itself to a selection of primary scrambling codes from the External Scrambling Code List. However, if a new femtocell access point is placed in the group closer to the exit/entry point of the overall coverage area, there would thereafter be far fewer reselections between the first femtocell access point and the macro layer, and so the first femtocell access point could then, on this more recent history, determine that it should no longer act as a 'gateway' cell. It could then select a primary scrambling codes either from the External Scrambling Code List or from the Internal Scrambling Code List.

In step 44, the femtocell access point sets its selection score, the use of which will be described later. The selection score is equal to [the number of PSCs in the selection pool]– [the number of unique PSCs that are in the selection pool and are used by one of the Tier 1 neighbours].

In step 46, the femtocell access point determines whether there is any primary scrambling code in its selection pool that is not already in use in one of the femtocell access points listed in the Master Relationship Table or in any other femtocell access point that it may be able to detect. (For example, the femtocell access point may be able to detect femtocell access points in other enterprises, or in nearby residential properties.)

If there is an unused PSC in the selection pool, the procedure passes to step 48, in which the femtocell access point selects the unused PSC. If there is more than one such PSC, the femtocell access point may select one at random. However, priority should preferably be given to primary scrambling codes in the External Scrambling Code List over scrambling codes in the Internal Scrambling Code List, if the selection pool contains both. In step 50, the femtocell access point then selects a Master Information Block (MIB) value tag (MVT). For example, it may select the MVT value randomly.

If it is determined at step 46 that there is no completely unused scrambling code, the process passes to step 52, in which it is determined whether there is any primary scrambling code in its selection pool that is not already in use in one of its Tier 1 or Tier 2 neighbours. It should be noted that the PSC selection algorithm only considers those neighbours that are on the same UARFCN, although in most cases this will include all of the femtocell access points within a group. Thus, if there are no unused PSCs in the selection pool, the algorithm attempts if possible to find a PSC that is in use only by a Tier 3 (or higher) neighbour.

If it is determined at step 52 that there is one or more primary scrambling code in its selection pool that is not already in use in one of its Tier 1 or Tier 2 neighbours, the process passes to step 54. In step 54, for each of these PSCs, the femtocell access point forms a count of the number of times each PSC/MVT combination appears in the Detected neighbour lists of all femtocell access points. It would be expected that if a PSC/MVT combination appears often as a Detected neighbour in the MRT then this combination is not in use by an isolated femtocell access point, and hence it would be preferable to try to avoid this PSC/MVT combination. In step 54, therefore, the femtocell access point selects the PSC/MVT combination that has the smallest count value. The femtocell access point may be able at this step to select a PSC/MVT combination that is not yet in use, even though all of the PSCs in the selection pool are in use. This use of different MVT values forces a UE to perform a Location Area Update when moving into the coverage area of another femtocell access point with the same PSC.

If it is determined at step 52 that there is no primary scrambling code in its selection pool that is not already in use in one of its Tier 1 or Tier 2 neighbours, the process passes to step 56. In step 56, it is determined whether there is any primary scrambling code in its selection pool that is not already in use in one of its Tier 1 neighbours (i.e. whether there is any primary scrambling code in its selection pool that is only in use in one of its Tier 2 neighbours).

If it is determined in step 56 that there is one or more PSC that is only in use in a Tier 2 neighbour, the process passes to step 58. In step 58, the femtocell access point selects a PSC/MVT combination. Specifically, as in step 54 above, the femtocell access point selects the PSC/MVT combination that has the smallest count value.

If it is determined in step 56 that all of the primary scrambling codes in the selection pool are already in use in Tier 1 neighbours, the process passes to step 60 in which one of the primary scrambling codes is selected. In this example, the selection is made in a way that attempts to minimise the risk of interference with the other devices using that primary scrambling code. In this example, the femtocell access point selects a scrambling code from amongst the primary scrambling codes in the External Scrambling Code List only.

In order to make the selection, the femtocell access point forms for each of these primary scrambling codes a value representing the combination of the count value and a pathloss weighting. More specifically, the combination is formed by adding a normalized version of the count value and a normalized pathloss value.

The normalized count value (norm_occ_t1) can be obtained from the count value (occ_t1) by first determining the maximum count value at Tier 1 for any PSC (max_occ_t1). Then for each PSC, the normalized count value is given by:

$$\text{norm\_occ\_t1} = occ\_t1 / \max\_occ\_t1.$$

The normalized pathloss value for each PSC is determined by finding the pathloss (Path_Loss) between the femtocell access point performing the procedure and each of its Detected Neighbours. The pathloss can be calculated because each cell broadcasts its CPICH Tx power (which is also communicated via the MRT), and the femtocell access point is able to determine the pathloss from this Tx power and the RSCP that it detects in its Downlink Monitor Mode. That is:

$$\text{Path\_Loss(in dB)} = CPICH \text{Tx power[Detected Neighbour]} - \text{RSCP[Detected Neighbour]}$$

Having calculated these pathloss values, the femtocell access point finds the smallest and largest path losses between the femtocell and its detected Neighbours.

That is:

Min Path Loss=Smallest path loss between femtocell access point and any Detected Neighbour Max Path Loss=Largest path loss between femtocell access point and any Detected Neighbour Then an offset is applied, using a parameter, Path_Loss_Weight_Offset, that is provided by the management node.

Max Path Loss=Max Path Loss−Max Path Loss*Path_Loss_Weight_Offset

Then, for all Detected neighbours, the normalized pathloss value (Norm_Path_Loss_Weight) can be calculated as following:

$$\text{Norm\_Path\_Loss\_Weight} = 1 - \frac{(\text{Path\_Loss} - \text{Min\_Path\_Loss})}{(\text{Max\_Path\_Loss} - \text{Min\_Path\_Loss})}$$

As mentioned above, the femtocell access point then calculates a combination of the count value and the pathloss weighting, by adding the normalized version of the count value (norm_occ_t1) and the normalized pathloss value (Norm_Path_Loss_Weight). Based on these calculations, the femtocell access point selects the PSC that has the smallest combined value.

The process then passes to step 62, in which it is determined whether, for that selected PSC, there is any MVT that is unused. If so, the process passes to step 64, in which an unused MVT is selected.

If it is determined in step 62 that there is no unused MVT, the process passes to step 66. In step 66, the femtocell access point considers separate values of the combination of the count value and the pathloss weighting for each MVT associated with the selected PSC, and that MVT is then selected.

FIG. 4 therefore shows the procedure that is performed in each access point in the group, on startup.

It will be apparent that the method attempts where possible to avoid selecting Primary Scrambling Codes that are in use by other femtocell access points, or at least by Tier 1 neighbour femtocell access points. If the same Primary Scrambling Code is used by two nearby femtocell access points, then a Location Area Update between the two may fail, or a UE receiver combining signals from the two femtocell access points could cause a call to drop.

The process supports two possible ranges of scrambling codes (External and Internal). The operator has the option of biasing the selection towards Internal PSCs to minimize the number of External PSCs, and hence minimize the size of the neighbour cell lists maintained by cells in the Macro Layer. However, unless specified by the operator through the management system, the process tends to select an External Scrambling Code in preference to an Internal Scrambling Code.

The MRT received by the femtocell access point selecting its PSC will contain information about all femtocell access points in the enterprise, even if they are allocated to different groups. Therefore, the algorithm can take into account PSC/MVT combinations that are in other enterprise groups, even if they cannot be directly detected by the femtocell access point selecting its PSC. Other femtocell access points will be taken into consideration only if they can be detected by the femtocell access point selecting its PSC, or if they appear in the neighbour cell list of a cell that can be detected.

In general, the process selects unused Scrambling Code (PSC) and MVT combinations before reusing a PSC/MVT combination. For example, when it is necessary to reuse a PSC, the process will try to select a non used PSC/MVT combination for that PSC that is least often used.

The process will try to avoid the selection of a PSC/MVT combination in use by a Tier 2 neighbour, and will aim to select a PSC/MVT is use by a Tier 3 neighbour in preference. When it is necessary to use a PSC/MVT combination in use by a Tier 2 neighbour, a normalized path loss weight is formed for use in the selection. This is a combination of both path loss weight and occurrence weight.

The process is self healing in that, if a femtocell access point is removed from the MRT, then the PSC/MVT combination that it was using becomes available for reuse. Moreover, this change to the MRT will trigger at least one femtocell access point to restart the procedure to select a PSC.

In one further embodiment, the management node can enable one or more of the femtocell access points to determine whether it should be allowed to determine whether it should act as a gateway cell. If this is allowed, the femtocell access point will be allowed to select an Internal Scrambling Code/MVT combination, even if there are External PSC/MVT combinations (for example less than a predetermined percentage of such combinations) still available. For example, the decision to select an Internal PSC might be made if all of the following conditions are met:
the femtocell access point is allowed by the management node to activate this feature;
the femtocell access point has detected femtocell neighbours;
other femtocells can detect the femtocell access point; and
there has been no idle mode reselection from the macro layer to the femtocell access point, or handout to a macro layer cell.

There is provided a mechanism whereby, in the event a conflict is detected, an attempt can be made to resolve the conflict. Otherwise an alarm can be raised at the management system.

The various femtocell access points in an enterprise group will go through the startup procedure in an unpredictable order. It is therefore quite possible that the procedure shown in FIG. 4 will result in a femtocell access point making a decision about selection of a scrambling code that, after several other access points have powered up, will no longer appear optimal. For example, these decisions may result in two Tier 1 neighbours being forced to select the same scrambling code.

Figure 5:
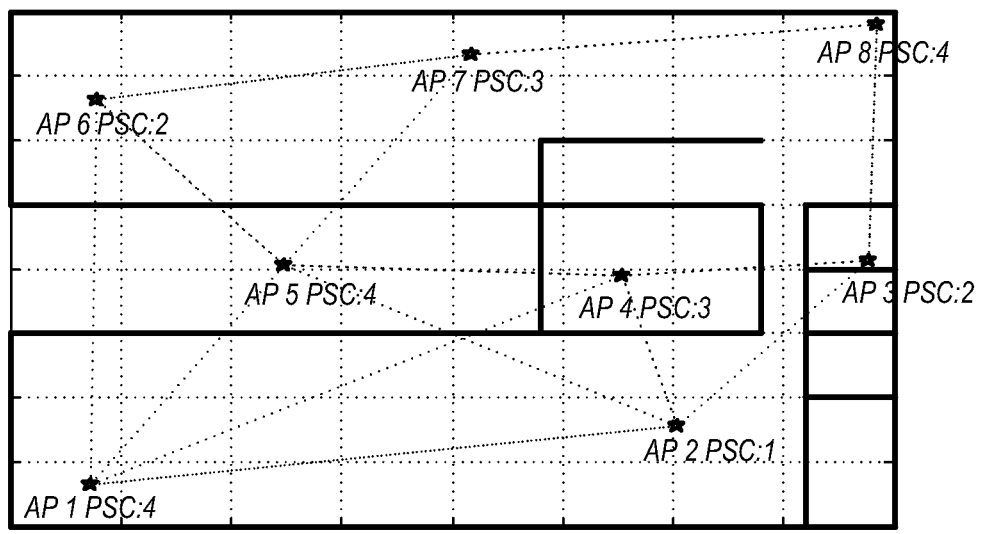
FIG. 5 is a schematic illustration of a situation in which the present invention may be used.

FIG. 5 shows such a situation, in the context of environment illustrated in FIG. 2, in a case where there are four available primary scrambling codes PSC:1-PSC:4. It can be seen that, in this illustrated situation, AP5 has five Tier 1 neighbours, namely AP1, AP2, AP4, AP6 and AP7. In addition, AP5 is the last of these access point to power up, and at the time that it powers up, AP1 has selected PSC:4; AP2 has selected PSC:1; AP4 has selected PSC:3; and AP6 has selected PSC:2. As a result, AP5 must select a primary scrambling code that clashes with one of its Tier 1 neighbours. As shown in FIG. 5, it selects PSC:4.

The clash resolution part of the algorithm tries to correct this sort of occurrence without causing a ripple effect through the group of access points, and without causing oscillations in PSC selections.

The procedure consists of a set of rules which look at the MRT relationships as well as the PSC choices and then decides whether a change can be made to resolve the clash. A suitable change may involve either one of the clashing access points selecting another PSC-MVT that is free at its Tier 1, or one of the clashing access points swapping PSCs with one of its tier 1 neighbours that it is not clashing with. If resolution is not possible, no changes are made, and the procedure relies on being able to differentiate between two access points using the same PSC by means of their MVT.

Figure 6:
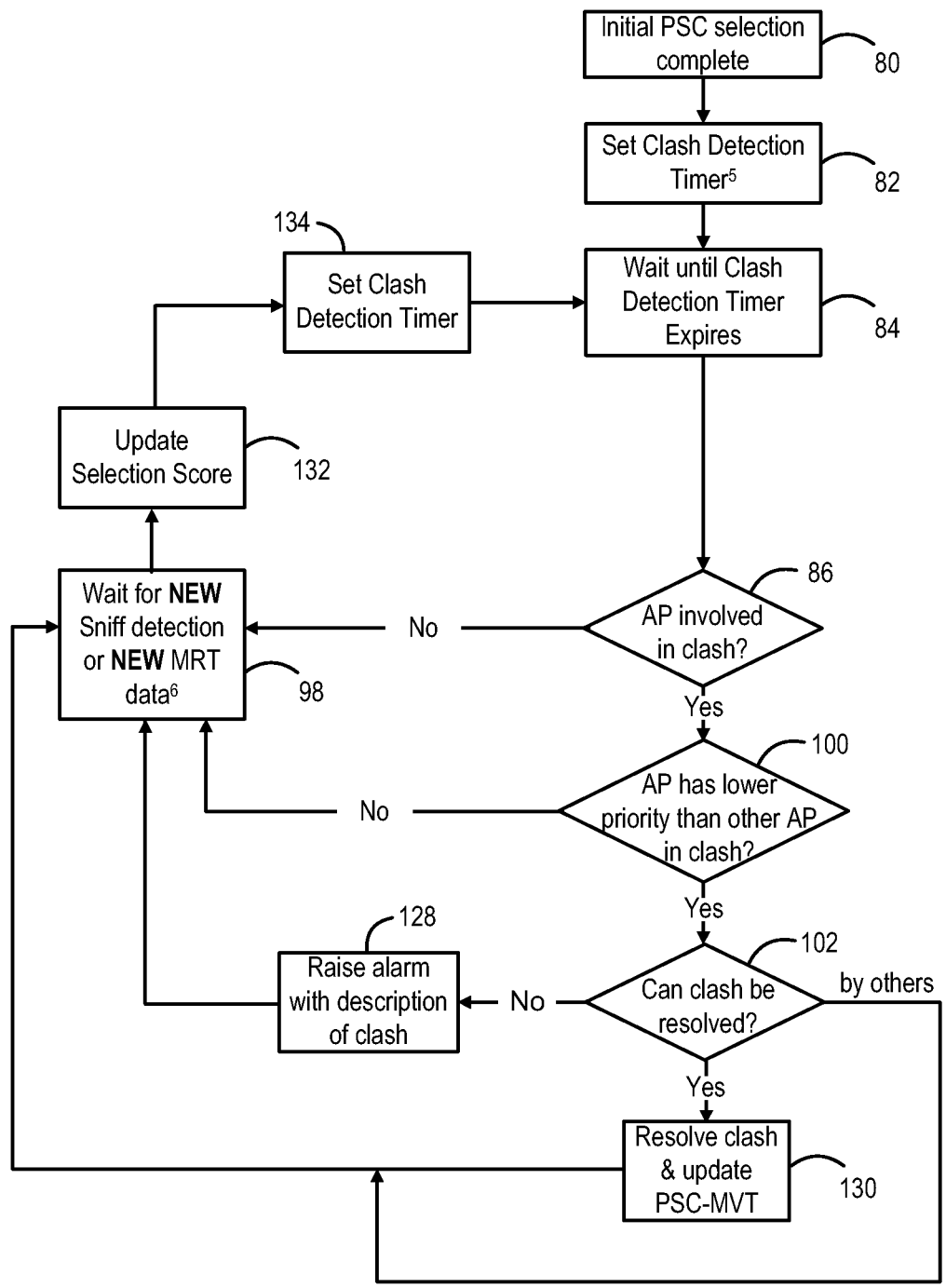
FIG. 6 is a flow chart illustrating a second process in accordance with the present invention.

FIG. 6 is a flow chart, illustrating a method by which scrambling code clashes are detected and, if possible resolved.

In step 80, the femtocell access point completes its initial primary scrambling code selection, as shown in FIG. 4. In step 82, a clash detection timer is set, defining a time interval at which the femtocell access point attempts to detect and resolve any scrambling code clashes. In step 84, this timer elapses, and the process passes to step 86, in which it is detected whether the femtocell access point is involved in a scrambling code clash.

Figure 7:
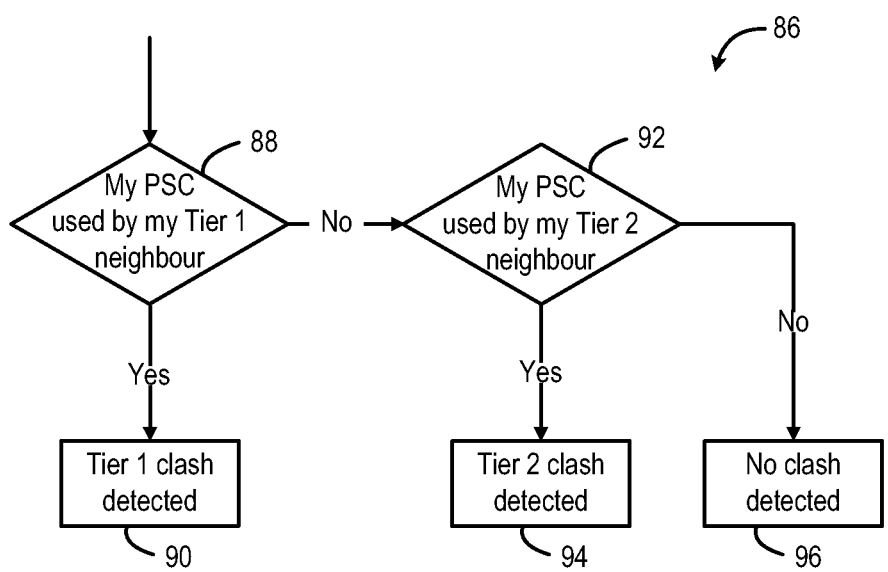
FIG. 7 is a flow chart illustrating in more detail a part of the process shown in FIG. 6.

FIG. 7 is a flow chart, illustrating in more detail step 86 of the process. Specifically, it is determined in step 88 whether the primary scrambling code selected by the femtocell access point is also in use by any Tier 1 neighbour of the femtocell access point. If so, the process passes to step 90, indicating that a Tier 1 clash has been detected.

If there is no Tier 1 clash, the process passes to step 92, in which it is determined whether the primary scrambling code selected by the femtocell access point is also in use by any Tier 2 neighbour of the femtocell access point. If so, the process passes to step 94, indicating that a Tier 2 clash has been detected. If there is no Tier 2 clash either, it is determined in step 96 that there is no clash that needs to be resolved, and the process of FIG. 6 passes to step 98, where it awaits new information, for example received in its Downlink Monitor Mode or in an updated Master Relationship Table, that might indicate that a new check needs to be made.

If it is determined in step 86 that there is a clash, the process passes to step 100, in which it is determined whether the femtocell access point has a lower priority than the other femtocell access point with which the clash has been detected. The priority of the femtocell access point is determined first by the PSC Selection Score 44, with priority given to those access points with a lower score. If the PSC Selection Scores are equal for the access points then the value of the creation time stamp indicating when the femtocell access point was added into the MRT is used, with priority given to the earlier creation time stamp. If the creation time stamps are both equal then the cell identifiers of the femtocells are used, with priority given to the lesser value. If the femtocell access point has a higher priority than the other femtocell access point with which the clash has been detected, the process passes to step 98 as described above.

If the femtocell access point has a higher priority than the other femtocell access point with which the clash has been detected, the process passes to step 102, in which it is determined whether the clash can be resolved and, if so, how.

Figure 8:
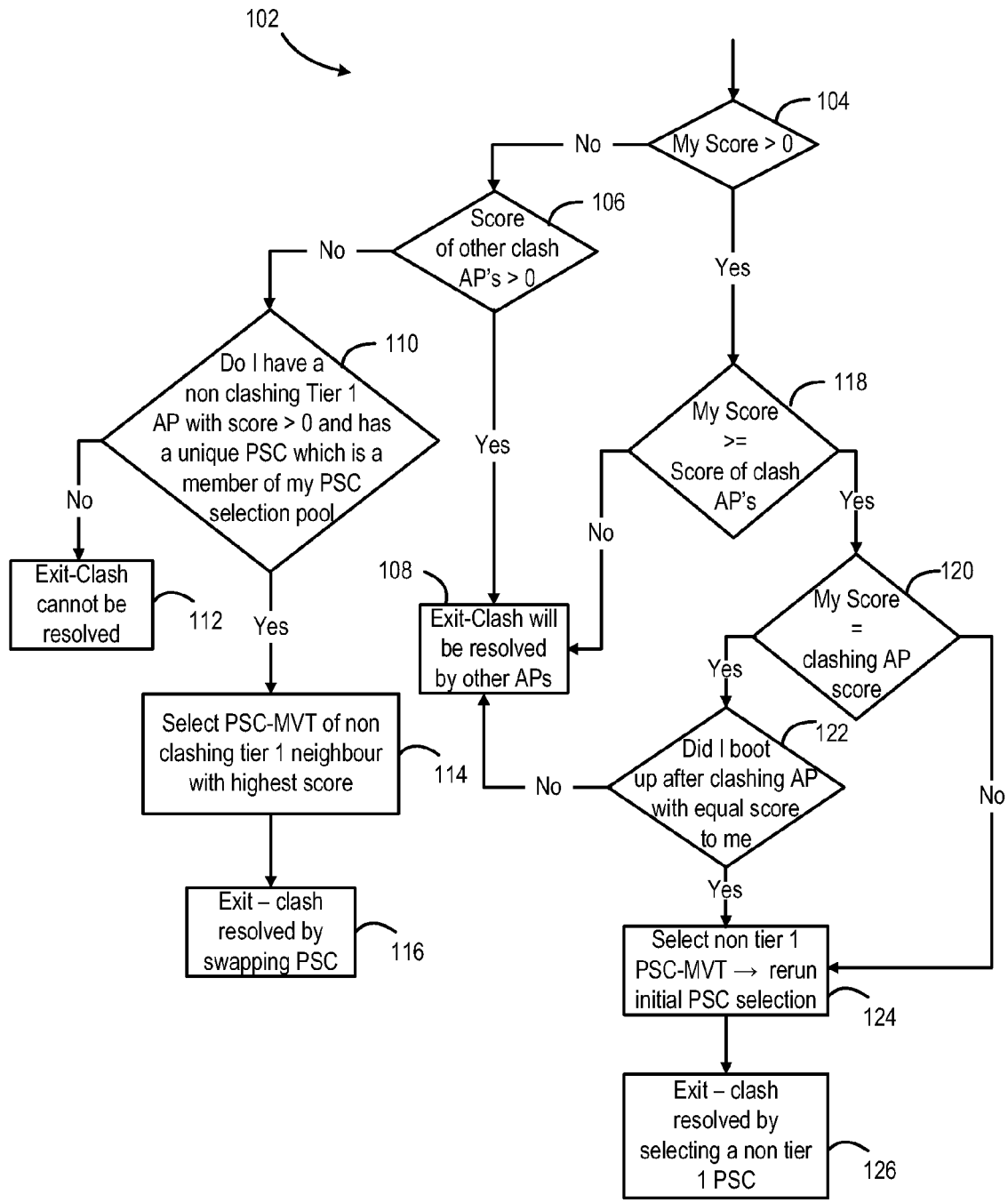
FIG. 8 is a flow chart illustrating in more detail a further part of the process shown in FIG. 6.

FIG. 8 is a flow chart, illustrating in more detail step 102 of the process. Firstly, it is determined in step 104 whether the selection score of the femtocell access point, previously calculated in step 44 of the process shown in FIG. 4, is greater than zero. If the score is equal to zero (i.e. if all of the PSCs in the selection pool are used by Tier 1 neighbours of the femtocell access point), the process passes to step 106.

In step 106, it is determined whether the femtocell access point, with which the clash has been detected, has a selection score greater than zero. If so, the process passes to step 108, indicating that the clash can best be resolved by taking action in the other femtocell access point, and so the process of step 102 comes to an end.

If the other femtocell access point, with which the clash has been detected, does not have a selection score greater than zero, the process passes to step 110. In step 110, the femtocell access point considers its Tier 1 neighbours, excluding the neighbour whose PSC clashes. Specifically, the femtocell access point considers any of the non-clashing Tier 1 neighbours that have selection scores greater than zero (i.e. that themselves have PSCs in their selection pools that are not used by any of their Tier 1 neighbours). The femtocell access point then determines whether any of the PSCs of those neighbours are in its own selection pool.

If not, the femtocell access point determines that the clash cannot be resolved, and passes to step 112.

If the determination in step 110 is positive, the process passes to step 114, in which the femtocell access point selects the PSC-MVT combination of one of the neighbours identified in step 110. The intention here is to find the neighbour that has the greatest freedom of selection of other PSC/MVT combinations, and then to select the PSC/MVT combination presently in use by that neighbour. More specifically, the femtocell access point examines the selection scores of those non-clashing Tier 1 neighbours that have selected PSCs within its own selection pool. Based on this, the femtocell access point finds the highest selection score, and it selects for its own use the PSC-MVT combination in use by the neighbour with the highest selection score.

The process then passes to step 116, where it ends as far as the first femtocell access point is concerned. The clash can then be resolved by a change of PSC in the neighbour whose PSC-MVT combination was selected in step 114.

If the process of FIG. 8 ended at step 112, this leads to step 128 in FIG. 6, in which it is determined that the clash cannot be resolved, and an alarm is raised. For example, the alarm may indicate that the problem could be resolved if the femtocell access point were physically relocated. Alternatively, the alarm may indicate to the operator that it should allocate more scrambling codes to the selection pool, for example by adding more Internal Scrambling codes. The process then passes to step 98 as described previously.

If it is determined in step 104 that the score is greater than zero, the process passes to step 118, in which it is determined whether the score is greater than or equal to the score of the femtocell access point with which the clash has occurred. If not, it is determined that the clash is best resolved by that other femtocell access point, and the process passes to step 108. If it is determined in step 118 that the score is greater than or equal to the score of the femtocell access point with which the clash has occurred, the process passes to step 120, in which it is determined whether the score is equal to the score of the femtocell access point with which the clash has occurred.

If it is determined in step 120 that the scores are equal, the process passes to step 122, in which it is determined which of the femtocell access points has the higher priority. If the femtocell access point did not boot up after the clashing femtocell access point, it is determined that the clash should be resolved by that other femtocell access point, and the process passes to step 108.

If it is determined in step 120 that the femtocell access point has a higher score than the other femtocell access point, or if it is determined in step 122 that the femtocell access point did boot up after the clashing femtocell access point, the process passes to step 124.

In step 124, the femtocell access point selects a PSC-MVT combination using a PSC that is not in use by any of its tier 1 neighbours. This can be achieved by rerunning the scrambling code selection procedure of FIG. 4, and the process then ends at step 126.

If the process of FIG. 8 ended at step 116 or at step 126, this leads to step 130 in FIG. 6, in which the femtocell access point updates the MRT to indicate the PSC-MVT combination that it has selected. Again, the process then passes to step 98 as described previously.

If the process of FIG. 8 ended at step 108, no further action is taken in the first femtocell access point, as the clash resolution depends on action in another femtocell access point, and the process passes directly to step 98 in FIG. 6.

When the process reaches step 98, if any new information is received, the femtocell access point recalculates its selection score based on the new information in step 132, sets the clash detection timer in step 134, and proceeds to step 84 as described previously.

Figure 9:
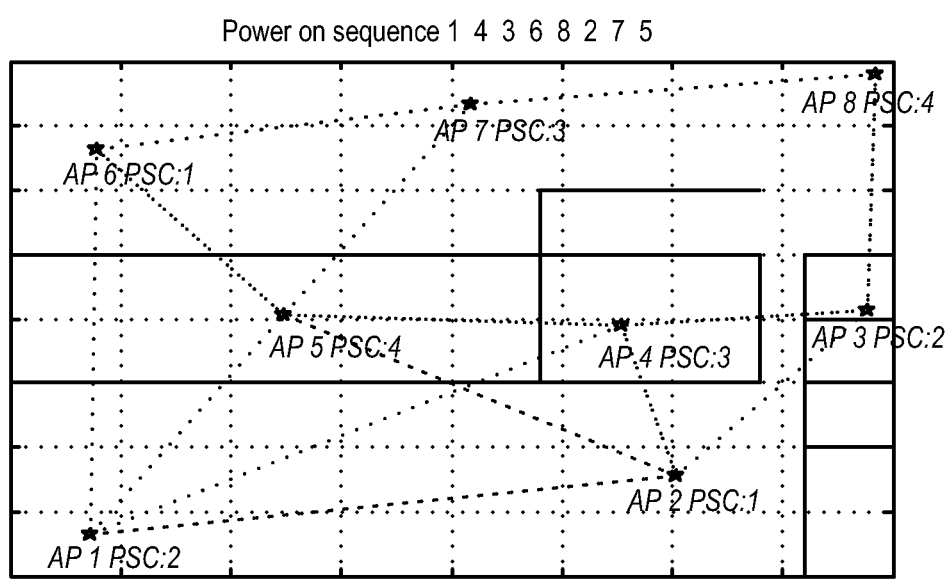
FIG. 9 is a schematic illustration of the use of the present invention may be used.

FIG. 9 shows the situation previously illustrated in FIG. 5, where the clash has been resolved. More specifically, AP5 was forced on startup to select a primary scrambling code that clashed with one of its Tier 1 neighbours, and selected PSC:4, which was also in use by AP1.

The clash was able to be resolved by AP1 performing the procedure shown in FIG. 6. It will be noted from an examination of FIG. 5 that AP1 was unable to resolve the clash simply by selecting a PSC that was not being used by any of its Tier 1 neighbours, because PSC:1 had been selected by AP2; PSC:2 had been selected by AP6; PSC:3 had been selected by AP4; and PSC:4 had been selected by AP5.

However, AP1 was able to identify that one of its Tier 1 neighbours (AP6) did not have any Tier 1 neighbour using PSC:1. Therefore, AP1 was able to select the PSC that had previously been selected by AP6 (i.e. PSC:2), and AP6 was then able to go on to select PSC:1 in order to resolve the clash.

There is thus described a mechanism by which each femtocell access point in a network is able to select a primary scrambling code in such a way that overall performance of the network is improved.

Although the invention is described herein with reference to a procedure for selecting scrambling codes used by femtocell access points, it will be noted that, where different base stations of a cellular network differentiate their transmissions by means of some alternative form of identifier, the same process can be used in the different base stations to select their identification codes.

The invention claimed is:

1. A method, for use in a basestation forming part of a group of basestations within a cellular communications network, for selecting an identifying code for use in identifying transmissions from the basestation, the method comprising:
   receiving from a management node a first list of identifying codes and a second list of identifying codes, wherein the identifying codes of the first list can appear in neighbour cell lists of basestations outside said group, and wherein the identifying codes of the second list can not appear in neighbour cell lists of basestations outside said group;
   determining whether there is at least one identifying code in the first list of identifying codes that is not used by any other basestation in said group;
   determining whether there is at least one identifying code in the second list of identifying codes that is not used by any other basestation in said group; and
   if there is at least one identifying code in the first list of identifying codes and at least one identifying code in the second list of identifying codes that are not used by any other basestation in said group, selecting an identifying code from the first list of identifying codes in preference to an identifying code from the second list of identifying codes.

2. A method as claimed in claim 1, wherein the identifying codes are scrambling codes.

3. A method as claimed in claim 1 or 2, wherein the basestation is a femtocell access point, and the group of basestations is a group of femtocell access points connected by means of a local area network.

4. A method, for use in a basestation forming part of a group of basestations within a cellular communications network, for selecting an identifying code for use in identifying transmissions from the basestation, the method comprising:
   receiving from a management node a first list of identifying codes and a second list of identifying codes, wherein the identifying codes of the first list can appear in neighbour cell lists of basestations outside said group, and wherein the identifying codes of the second list can not appear in neighbour cell lists of basestations outside said group;
   determining whether it is necessary to be able to perform cell reselection between the basestation and basestations outside said group;
   determining whether there is at least one identifying code in the first list of identifying codes that is not used by any other basestation in said group;
   if it is determined that it is necessary to be able to perform cell reselection between the basestation and basestations outside said group and that there is at least one identifying code in the first list of identifying codes that is not used by any other basestation in said group, selecting an identifying code from the first list of identifying codes in preference to an identifying code from the second list of identifying codes; and
   if it is determined that it is not necessary to be able to perform cell reselection between the basestation and basestations outside said group, selecting an identifying code from the first list of identifying codes or from the second list of identifying codes.

5. A method as claimed in claim 4, further comprising:
   determining whether it is necessary to be able to perform cell reselection between the basestation and basestations outside said group, based on a history of cell reselections involving the basestation.

6. A method as claimed in claim 4 or 5, wherein the basestation is a femtocell access point, and the group of basestations is a group of femtocell access points connected by means of a local area network.

7. A method, for use in a management node of a cellular communications network, wherein the network includes at least one group of basestations and further includes other basestations not within said group, the method comprising:
   dividing one or more available identifying codes into a first list of identifying codes and a second list of identifying codes, wherein the identifying codes of the first list can appear in neighbour cell lists of basestations outside said group, and wherein the identifying codes of the second list can not appear in neighbour cell lists of basestations outside said group;
   notifying the basestations in said group of basestations of the first list of identifying codes and the second list of identifying codes;
   determining whether there is at least one identifying code in the first list of identifying codes;
   determining whether there is at least one identifying code in the second list of identifying codes; and
   selecting an identifying code from the first list of identifying codes in preference to an identifying code from the second list of identifying codes.

8. A method as claimed in claim 7, wherein the identifying codes are scrambling codes.

9. A method of allocating identifying codes to basestations forming part of a group of basestations within a cellular communications network, the method comprising, in each basestation within the group:
   selecting an identifying code in a manner that attempts where possible to avoid selecting the same identifying code as a neighbour, wherein selecting the identifying code comprises:
      receiving a first list of identifying codes and a second list of identifying codes, wherein the identifying codes of the second list can not appear in neighbour cell lists of basestations outside said group;
      determining whether there is at least one identifying code in the first list of identifying codes that is not used by any other basestation in said group;
      determining whether there is at least one identifying code in the second list of identifying codes that is not used by any other basestation in said group; and
      selecting an identifying code from the first list of identifying codes in preference to an identifying code from the second list of identifying codes,
   and the method further comprising, in at least one basestation within the group:
      determining that a clash has occurred if any neighbour basestation has selected the same identifying code as said at least one basestation, and
      if a clash has occurred, determining whether the clash can be resolved by said basestation or by another basestation in said group.

10. A method as claimed in claim 9, further comprising, if a clash has occurred:
    determining whether there are any identifying codes that are not in use by neighbours of the basestation; and
    if so, selecting an identifying code that is not in use by a neighbour of the basestation.

11. A method as claimed in claim 10, further comprising:
    if there are no identifying codes that are not in use by neighbours of the basestation, identifying a neighbour that has a high freedom of selection of an alternative identifying code; and
    selecting the identifying code that is in use by that neighbour.

12. A method as claimed in claim 11, further comprising:
for one or more basestations, calculating a freedom of selection parameter, based on a number of identifying codes potentially available for use by that basestation and on a number of said available identifying codes that are actually in use by neighbours of that basestation.

13. A method as claimed in any of claims 9 to 12, wherein the basestations are femtocell access points.

14. A method as claimed in any of claims 9 to 12, wherein the identifying codes comprise scrambling codes.

15. A method as claimed in claim 14, wherein the identifying codes further comprise Master Information Block (MIB) Value Tags.

16. A basestation, for use in a cellular communications network, being configured to:
receive from a management node a first list of identifying codes and a second list of identifying codes, wherein the identifying codes of the first list can appear in neighbour cell lists of basestations outside said group, and wherein the identifying codes of the second list cannot appear in neighbour cell lists of basestations outside said group;
determine whether there is at least one identifying code in the first list of identifying codes that is not used by any other basestation in said group;
determining whether there is at least one identifying code in the second list of identifying codes that is not used by any other basestation in said group; and
if there is at least one identifying code in the first list of identifying codes and at least one identifying code in the second list of identifying codes that are not used by any other basestation in said group, select an identifying code from the first list of identifying codes in preference to an identifying code from the second list of identifying codes.

17. A basestation, for use in a cellular communications network, the basestation being configured to:
receive from a management node a first list of identifying codes and a second list of identifying codes, wherein the identifying codes of the first list can appear in neighbour cell lists of basestations outside said group, and wherein the identifying codes of the second list can not appear in neighbour cell lists of basestations outside said group;
determine whether it is necessary to be able to perform cell reselection between the basestation and basestations outside said group;
determine whether there is at least one identifying code in the first list of identifying codes that is not used by any other basestation in said group;
if it is determined that it is necessary to be able to perform cell reselection between the basestation and basestations outside said group and that there is at least one identifying code in the first list of identifying codes that is not used by any other basestation in said group, select an identifying code from the first list of identifying codes in preference to an identifying code from the second list of identifying codes; and
if it is determined that it is not necessary to be able to perform cell reselection between the basestation and basestations outside said group, select an identifying code from the first list of identifying codes or from the second list of identifying codes.

18. A system comprising a group of basestations within a cellular communications network, wherein each basestation within the group:
selects an identifying code in a manner that attempts where possible to avoid selecting the same identifying code as a neighbour, wherein selecting the identifying code comprises:
receiving a first list of identifying codes and a second list of identifying codes, wherein the identifying codes of the second list can not appear in neighbour cell lists of basestations outside said group;
determining whether there is at least one identifying code in the first list of identifying codes that is not used by any other basestation in said group;
determining whether there is at least one identifying code in the second list of identifying codes that is not used by any other basestation in said group; and
selecting an identifying code from the first list of identifying codes in preference to an identifying code from the second list of identifying codes,
and, at least one basestation within the group:
determines that a clash has occurred if any neighbour basestation has selected the same identifying code as said at least one basestation, and
if a clash has occurred, determines whether the clash can be resolved by said basestation or by another basestation in said group.

\* \* \* \* \*